United States Patent [19]

Hall

[11] Patent Number: 4,629,373
[45] Date of Patent: Dec. 16, 1986

[54] POLYCRYSTALLINE DIAMOND BODY WITH ENHANCED SURFACE IRREGULARITIES

[75] Inventor: David R. Hall, Provo, Utah

[73] Assignee: Megadiamond Industries, Inc., Provo, Utah

[21] Appl. No.: 506,725

[22] Filed: Jun. 22, 1983

[51] Int. Cl.[4] .............................................. B23B 27/14
[52] U.S. Cl. ...................................... 407/118; 51/307; 51/309; 76/101 R; 76/DIG. 12; 175/329; 428/408
[58] Field of Search ................ 407/118, 119; 408/145; 125/30 R, 39; 76/101 R, 101 A, DIG. 12; 51/307, 309; 428/408; 175/329, 330

[56] References Cited

U.S. PATENT DOCUMENTS

| 1,974,215 | 9/1934 | Kilmer | 407/118 |
| 2,337,322 | 12/1943 | Gascoigne | 407/118 |
| 2,805,468 | 9/1957 | Williams | 407/41 |
| 2,811,960 | 11/1957 | Fessel | 408/145 |
| 4,109,737 | 8/1978 | Bouenkerk | 407/118 |

FOREIGN PATENT DOCUMENTS

| 58-069779 | 4/1983 | Japan . | |
| 790805 | 2/1958 | United Kingdom | 407/118 |
| 2037629 | 7/1980 | United Kingdom | 407/118 |

Primary Examiner—Francis S. Husar
Assistant Examiner—Jerry Kearns
Attorney, Agent, or Firm—Willian Brinks Olds Hofer Gilson & Lione Ltd.

[57] ABSTRACT

A polycrystalline diamond body with a plurality of faces having enhanced surface irregularities over at least a portion of at least one of the faces is disclosed. The polycrystalline diamond body with the enhanced surface irregularities attaches to other materials such as metal by conventional mounting techniques. The polycrystalline diamond bodies of this invention are without a carbide or metal backing. The pattern forming the enhanced surface irregularities of this invention can be predetermined or random. Similarly the pattern can be randomly distributed on the surface or positioned in a repeatable pattern. It is therefore not necessary that the surface irregularities be uniform in either shape or size. One method of forming the enhanced irregularities is during the press cycle during which the polycrystalline diamond is formed with screens, molds, or free standing bodies. The extent, form and location of the enhanced surface irregularities is controlled by the configuration of the screens, molds or free standing bodies. An alternative method to form enhanced surface irregularities in a polycrystalline diamond involves the use of an EDM machine, laser or other suitable techniques to form the enhanced irregularities after the polycrystalline diamond has been formed.

1 Claim, 17 Drawing Figures

POLYCRYSTALLINE DIAMOND BODY WITH ENHANCED SURFACE IRREGULARITIES

BACKGROUND OF THE INVENTION

1. Field of the Invention

This invention relates to a polycrystalline diamond body having improved utility and improved properties or characteristics including significantly improved adhesion properties for attachment to metal or other materials used for tool supports or holders. Polycrystalline diamond is now commonly used in a composite compact form. This composite compact is comprised of a polycrystalline diamond portion intimately bonded to a cemented tungsten carbide backing. The carbide backing of this composite compact is mounted onto a tool support or holder for subsequent drilling, turning, cutting or similar operations which take advantage of the super wear resistant diamond surface. Polycrystalline diamond is also used without the carbide backing and after the chemical catalyst/binder needed for polycrystalline growth has been leached out in an acid bath. The leached polycrystalline is then set into a metal matrix for subsequent use. This invention also relates to the method of making the improved polycrystalline diamond body during an ultra high pressure and temperature press cycle, as well as the method of making the improved polycrystalline diamond body with post press techniques.

Throughout the following disclosure it should be understood that the term "diamond" is intended to cover all super hard abrasive materials including but not limited to synthetic or natural diamond, cubic boron nitride and wurtzite boron nitride as well as combinations thereof.

2. Prior Art

Diamond with its unsurpassed wear resistance is the most effective material for many industrial applications such as machining and earth drilling. Because of the high costs involved in mining natural diamond or manufacturing synthetic diamond, its relatively brittle characteristics, and its size limitation, it is impractical to fabricate entire tools from diamond. Consequently, diamond is used with a tool holder or support made from metal or other appropriate materials. The utilization of diamond in tools has, however, been limited because diamond is not readily attachable to metal or other materials. This non-attachability is most likely due to the inertness of diamond and the difference in the chemical structure of the surface of diamond and that of other materials.

An early solution to this problem of non-attachability involved setting single crystal diamond into a metal matrix by surrounding the single crystal diamond with molten metal and allowing the metal to form around the diamond. In particular, more than half of a single crystal diamond body is surrounded and held in a pocket of metal such that the diamond is mechanically locked in the metal. The exposed portion of the diamond is sharpened to a point and held against a workpiece for drilling, turning or cutting or other related purposes. This system, however, is costly as it requires a substantial quantity of diamond which is unexposed and useless for cutting or drilling purposes. Another problem with this system is that it uses single crystal diamond. In particular, single crystal diamond tends to fracture when a large or sudden force is applied in the direction of one of its planes of cleavage. Consequently, when single crystal diamond is fixedly set into a metal matrix, limitations are imposed upon the angles at which it can be used. This problem with the planes of cleavage is not limited to applications where single crystal diamond is set into a metal matrix. Rather, in substantially all industrial applications single crystal diamond will tend to fracture if subjected to forces in the direction of the plane of cleavage.

Diamond in its polycrystalline form has an added toughness over single crystal diamond due to the random distribution of the crystals so that there are not particular planes of cleavage. Therefore polycrystalline diamond is frequently the preferred form of diamond in many drilling, turning, cutting or similar operations and has been directly substituted for single crystal diamond for use in a metal matrix.

Polycrystalline diamond can be manufactured in a press in which grains of diamond and other starting materials are subjected to ultrahigh pressure and temperature conditions. The methods of making poylcrystalline diamond in a press are well known in the art and further detailed description thereof is not considered necessary. Polycrystalline diamond, however, like single crystal diamond is relatively non-wettable and its surface does not readily attach or adhere to other materials. Two of the most common techniques which have been used with polycrystalline diamond to circumvent this problem of non-attachability are first, forming a composite compact which is polycrystalline diamond with a cemented tungsten carbide backing and brazing this composite compact to a holder or support and second, setting polycrystalline diamond without a carbide backing into a metal matrix.

In the brazing application, it is first necessary to "grow" polycrystalline diamond directly onto a carbide substrate by placing a cemented carbide piece and diamond grains mixed with a catalyst binder into a container of a press and subjecting it to a press cycle using ultrahigh pressure and temperature conditions. As a result, at the ultrahigh temperature and pressure needed for polycrystalline formation, the resulting polycrystalline diamond body is intimately bonded to the carbide piece resulting in a composite compact being in the form of a layer of polycrystalline diamond intimately bonded to a carbide substrate. The polycrystalline diamond body in the form of a composite compact is then attachable to other materials through the exposed surface of the carbide backing by conventional soldering or brazing methods employing relatively low temperatures at which the polycrystalline diamond structure remains stable. The use of polycrystalline diamond in the composite compact form has become the standard for industrial application of polycrystalline diamond where it is brazed to other materials.

One problem, however, with composite compacts arises during the cooling of the composite compact after it has been formed which stresses the polycrystalline diamond structure. The diamond and carbide bond is formed in the press at a temperature in the range of 1300°–2000° C. At this temperature, the compact is stable. As the compact cools, however, a residual stress arises at the diamond carbide interface due to a difference in the coefficients of thermal expansion of the two materials. In particular, the carbide substrate has a higher coefficient of thermal expansion than the polycrystalline diamond body so that it contracts more than the polycrystalline diamond body during the cooling period. This difference can cause the polycrystalline diamond structure to fracture either during the cooling process resulting in rejections or after cooling and during use of the polycrystalline diamond.

A second problem with composite compacts arises with the use of cobalt or other metal catalyst/binder systems which are often used for polycrystalline growth. After crystalline growth is complete, the catalyst/binder remains within the pores of the polycrystalline structure. Because cobalt or other metal catalyst/binders have a higher coefficient of thermal expansion than diamond, when the composite compact is heated, e.g., during the brazing process by which it is attached to a holder or during actual use, the metal from the binder expands at a higher rate than the diamond. Therefore, when the compact is subjected to temperatures above a critical level, fractures throughout the polycrystalline diamond structure result. Another disadvantage of leaving a catalyst/binder within the pores results from the fact that the catalyst used to lower the energy of activation required for polycrystalline growth during the press cycle will likewise lower the energy of activation required for polycrystalline degradation. In other words, the presence of a catalyst in the pores causes polycrystalline degradation to occur at a lower temperature than when the catalyst is not present in the pores thus placing another limitation on the temperature to which the compact can be subjected.

A third problem which often arises from the composite compact involves the migration of the cobalt binder present in the most commonly used type of cemented carbide phase into the pores of the diamond layer. In particular, cobalt or other metal binders are always present in cemented carbide. When a carbide substrate and diamond grains are subjected to the ultrahigh pressures and temperatures needed for intercrystalline diamond growth, the cobalt or other metal binder present in the carbide migrates into the polycrystalline diamond phase. This migration into the polycrystalline diamond phase has no substantial effects on the polycrystalline diamond structure when the binder used in the polycrystalline diamond phase is the same as that in the cemented carbide substrate. However, when a binder system which is different from that present in the cemented carbide substrate is used in the polycrystalline diamond phase for polycrystalline growth, e.g., silicon, the migration of the cobalt or other material from the substrate into the polycrystalline diamond phase results in undesirable contamination of the polycrysalline diamond portion. This alters the properties of the polycrystalline diamond and may limit its utility. For example, by reducing the thermal stability of the polycrystalline diamond. Therefore when a cemented carbide substrate is used, the choice of catalyst/binder systems is limited.

A second common use of polycrystalline diamond involves setting polycrystalline diamond without a carbide backing into a metal matrix. In particular, the polycrystalline diamond is placed in a mold into which metal powder is added. Subsequent heating cements the metal powder around the diamond. For this use, the polycrystalline diamond is grown in a press after which it is placed in an acid bath. The acid bath leaches out the catalyst/binder which remains in the pores of the polycrystalline diamond. The acid also dissolves any cemented carbide backing, which, of course, precludes using an acid treated polycrystalline body in the brazing application. The removal of the binder from the pores of the polycrystalline diamond results in a more stable structure which has a higher degradation temperature so that it withstands the temperature required to cement the metal powder of the matrix.

There are, however, a number of problems associated with the use of polycrystalline diamond set into a metal matrix. First, as with single crystal diamond, a substantial quantity of diamond which is unexposed and useless for cutting or drilling purposes is necessary. Second, the number of cutting surfaces is restricted as a substantial portion of the diamond body is surrounded by the metal matrix. Third, because of the relatively deep pocket of matrix needed to hold the polycrystalline diamond body in the tool, failure often occurs when the matrix material wears away and the diamond body accordingly becomes dislodged.

OBJECTS OF THE INVENTION

It is, therefore, a general object of the present invention to resolve the aforementioned problems. It is another general object to provide a polycrystalline diamond body which is free from a carbide backing and is attachable to other materials or is settable into a metal matrix with improved attachability. It is another general object of this invention to provide a polycrystalline diamond body which has enhanced irregularities over at least a portion of at least one of its surfaces to facilitate improved mechanical attachment of the diamond into or onto the metal matrix or other material. It is another general object of this invention to provide a polycrystalline diamond body which has enhanced irregularities over at least a portion of at least one of its surfaces to both increase the total bonding surface area for attachment and allow for interlocking of the polycrystalline diamond body with an appropriate tool holder or support. It is yet another general object of this invention to provide a method for enhancing the surface irregularities of at least a portion of at least one surface of a polycrystalline diamond which includes the press cycle for forming the polycrystalline body. It is another general object of this invention to provide a method for enhancing the surface irregularities of at least a portion of at least one surface of a polycrystalline diamond body which does not include the manner or process in which the polycrystalline diamond is formed.

It is a specific object of this invention to provide a polycrystalline diamond body that has surface irregularities over at least a portion of at least one of its surfaces enhanced by the formation of grooves or holes. It is another specific object of this invention to provide a polycrystalline diamond body that has the surface irregularities over at least a portion of at least one of its surfaces enhanced by the formation of a textured or weaving pattern on the surface. It is yet another specific object of this invention to provide a method of manufacturing one or more polycrystalline diamond bodies during a press cycle with each polycrystalline diamond body being grown on a mold, screen, free standing bodies or other enhancing means which is subsequently removed or dissolved to result in a polycrystalline diamond body with enhanced surface irregularities over at least a portion of at least one of its surfaces. It is a further specific object of this invention to provide a method of enhancing the surface irregularities of at least a portion of at least one of the surfaces of a polycrystalline diamond body by forming grooves or similar enhanced irregularities by an EDM or similar post press techniques.

SUMMARY OF THE INVENTION

The present invention is a polycrystalline diamond body with a plurality of faces or surfaces and with surface irregularities enhanced over at least a portion of at least one of the faces or surfaces. The polycrystalline diamond body with the enhanced surface irregularities over at least a portion of at least one of its surfaces attaches or adheres to other material such as metal by conventional mounting techniques. The extent of the enhanced irregularities as well as the form of the enhanced irregularities and their position on the polycrystalline diamond body is variable depending upon the use for which the polycrystalline diamond body is designed.

The most important aspect of this invention is a polycrystalline diamond body without a carbide or similar metal backing but which has enhanced surface irregularities over at least a portion of at least one of its surfaces to enable attachment of the polycrystalline body to other materials such as metal by conventional mounting techniques. One method of forming the enhanced irregularities over at least a portion of at least one surface of the polycrystalline diamond body includes the press cycle during which the polycrystalline diamond is formed. During this method the diamond starting material is placed upon a screen, mold or free standing bodies and subjected to the press cycle at ultrahigh temperatures and pressures. The polycrystalline diamond is thus grown on the screen, mold or free standing bodies to form a composite compact structure. The compact is then removed from the press and the mold is disolved by an acid bath or other means. The resulting polycrystalline diamond body has enhanced surface irregularities at the location vacated by the dissolved or removed screen, mold or free standing bodies. The extent, form and location or position of the enhanced surface irregularities is controlled by the configuration of the screen, mold or free standing bodies. An alternative method to form the enhanced surface irregularities in a polycrystalline diamond body involves the use of an EDM machine, laser or other suitable techniques to form the enhanced irregularities after the polycrystalline diamond body has been formed.

In the preferred embodiment of this invention the enhanced surface irregularities over at least a portion of at least one surface of the polycrystalline diamond is textured in form. This textured surface has a plurality of holes or crevices in it with a series of intersecting channels interconnecting the holes. The diameter or width of each channel or crevice of the diamond body varies with the depth of the channel or crevice. When this textured surface is attached to a metal substrate by conventional matrix forming techniques, the metal penetrates into the holes and crevices and along the channels so that the diamond and metal substrate are mechanically locked together. In this embodiment, there is three dimensional bonding as opposed to two dimensional bonding where the surfaces being bonded are substantially smooth. There is also mechanical interlocking in this embodiment resulting from the channels and crevices having a width or diameter at the surface of the polycrystalline diamond body which is less than the width or diameter of the channel or crevice below the diamond surface through which a plane parallel to the surface of the polycrystalline body passes. As a result of this configuration when the polycrystalline diamond body is attached to another material, the polycrystalline diamond body becomes interlocked with this material.

In an other embodiment of the invention, the enhanced surface irregularities of at least a portion of at least one surface of the polycrystalline diamond body is formed by grooves which are spaced in parallel relationship or cross-hatched.

In yet other embodiments of this invention, the enhanced surface irregularities of at least a portion of at least one surface of the polycrystalline diamond are formed by a pattern of holes or stippling or other random forms. The pattern forming the enhanced surface irregularities of this invention can therefore be predetermined or random. Similarly the pattern can be randomly distributed on the surface or positioned in a predetermined or regular pattern. Of course the depth and diameter of the holes or of the geometric or random forms can be varied and it is not necessary that these holes or forms be uniform in size or shape.

DESCRIPTION OF THE DRAWINGS

The present invention will be more clearly understood from the following detailed description of specific embodiments, read in conjunction with the accompanying drawings, wherein.

It should be understood that the drawings are not necessarily to scale and that the embodiments are illustrated by graphic symbols, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION

Figure 3:
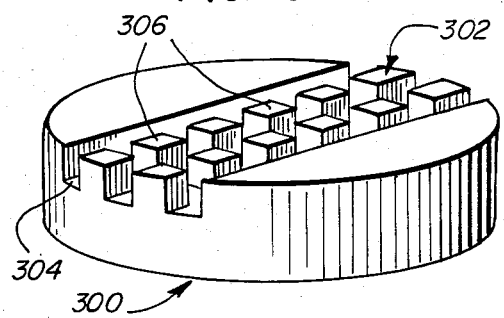
FIG. 3 is a perspective drawing illustrating a disc shaped polycrystalline diamond body with enhanced surface irregularities over at least a portion of at least one of its surfaces where the enhanced surface irregularities are in the form of a plurality of protrusions or cross-hatched grooves.
Figure 4:
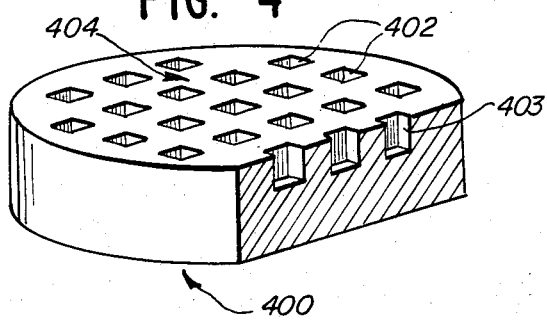
FIG. 4 is a sectioned perspective view of a disc shaped polycrystalline diamond body with enhanced surface irregularities over at least one of its surfaces where the enhanced irregularities are in the form of a plurality of holes in its surface.
Figure 5:
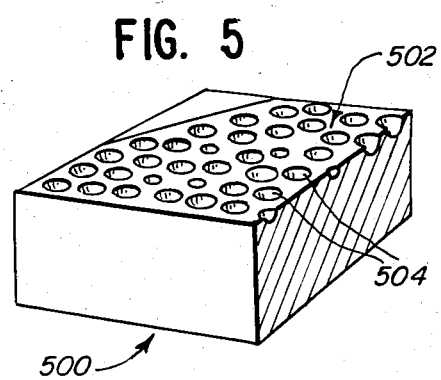
FIG. 5 is a sectioned perspective view of a square shaped polycrystalline diamond body with enhanced surface irregularities over at least a portion of at least one of its surfaces where the enhanced surface irregularities are in the form of a pitted surface.
Figure 1A:
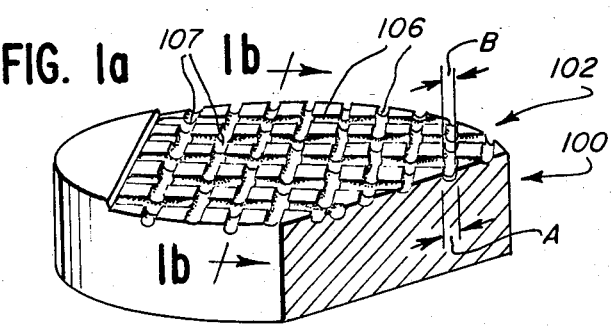
FIG. 1a is a sectioned perspective view of the preferred embodiment of this invention showing a disc shaped polycrystalline diamond body with enhanced surface irregularities over at least a portion of at least one of its surfaces where the enhanced irregularities are in the form of a textured surface.

FIGS. 1a through 5 show perspective views of various embodiments of the polycrystalline diamond bodies with enhanced surface irregularities over at least a portion of at least one surface. FIGS. 1-4 illustrate the polycrystalline diamond body as substantially disc shaped and FIG. 5 illustrates a portion of a square polycrystalline diamond body. This is done solely for the sake of drafting convenience and it should be understood that the polycrystalline diamond body of this invention can be of any shape or form. FIGS. 1a and 1b illustrate the preferred embodiment of the present invention. The polycrystalline diamond body 100 has enhanced irregularities in the form of a textured surface 102 with a series of interwoven channels 106 and holes or crevices 107 where the channels 106 intersect. FIG. 1b illustrates a portion of these channels 106 and holes 107. The pattern of these channels 106 can be of any geometric shape and size and the tightness of the textured pattern can be varied without departing from the scope of this invention. Also, the width, depth and geometric configuration of each channel 106 and hole 107 may be varied without departing from the scope of the present invention. In this embodiment the width A of the channel 106 at a predetermined plane below the surface 102 of the body is greater than the width B at the surface 102 of the body. Likewise, the width C of each hole 107 at a predetermined plane below the surface 102 is greater than the width D of the hole 107 at the surface 102 of the body.

Figure 2:
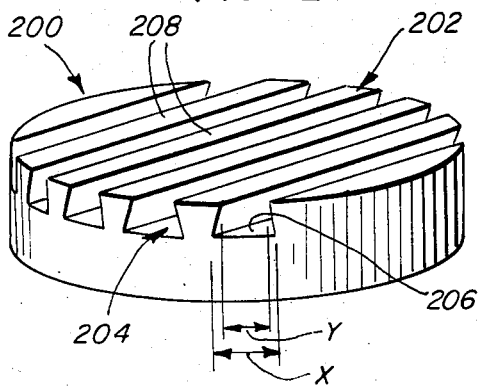
FIG. 2 is a perspective drawing illustrating a disc shaped polycrystalline diamond body having enhanced surface irregularities over at least one of its surfaces where the enhanced irregularities are in the form of grooves with angled walls.

FIG. 2 illustrates a polycrystalline diamond body 200 where the enhanced surface irregularities are in the form of a grooved surface 202. The grooved surface 202 has a plurality of channels or grooves 204 which are substantially parallel to each other. Each groove 204 has side walls 205 which are angled. The width, depth and geometric configuration of each groove may be varied without departing from the scope of the present invention. In this embodiment the width X of the groove at its base 206 is greater than the width Y at the surface 202 of the body 200. This differential in widths enables the polycrystalline diamond body to be mechanically interlocked with an appropriate substrate such as a tool or support resulting in a plugging of the substrate with the polycrystalline diamond body. Alternatively, this embodiment can be viewed as having a series of bars or elevations 208 which are trapezoidal in cross section. In another geometric form which is feasible, the width of the groove at its base is smaller than the width at the surface of the diamond body.

FIG. 3 shows a polycrystalline diamond body 300 which is grooved in two directions over a portion of its top surface. The result is a partly cross-hatched surface 302 comprised of intersecting channels 304. Alternatively, the enhanced surface irregularities of this polycrystalline diamond body 300 can be characterized as having a plurality of knobs 306 protruding from a portion of the top surface of the polycrystalline diamond body 300. The width, depth and geometric configuration of each groove may be varied without departing from the scope of the present invention.

FIG. 4 shows a polycrystalline diamond body 400 with a plurality of openings or holes 402 forming a waffled surface 404. In FIG. 4, the sectioned portion of each hole 402 is in the shape of a square 403. Of course other geometric shapes of the holes of FIG. 4 or the knobs of FIG. 3 are contemplated and within the scope of this invention. The surface 404 of the diamond body 400 in FIG. 4 is the obverse of the gridded portions of the surface 302 of the diamond body 300 with enhanced surface irregularities shown in FIG. 3.

FIG. 5 shows a portion of a square polycrystalline diamond body 500 with a pitted surface 502 with randomly spaced, shaped and positioned cavities 504.

Figure 9A:
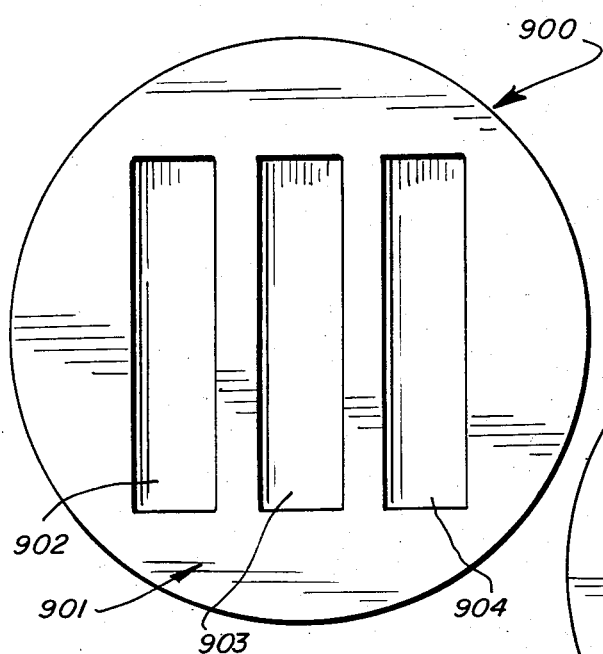
FIG. 9a is a top view of a disc shaped polycrystalline diamond body having areas of enhanced surface irregularities over at least one of its surfaces where the areas of enhanced irregularities are positioned in a repeatable pattern.
Figure 9B:
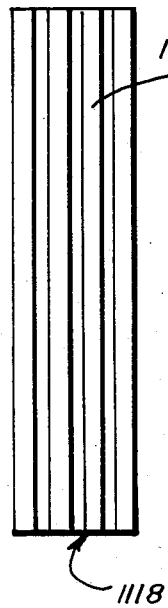
FIG. 9b is a top view of one area of enhanced surface irregularities of FIG. 9a in the form of a grooved pattern.
Figure 9C:
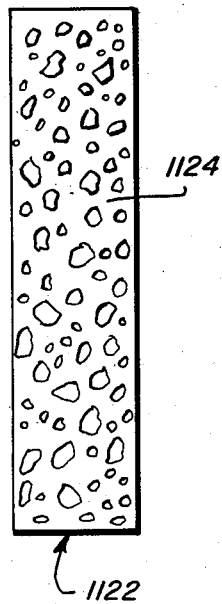
FIG. 9c is a top view of one area of enhanced surface irregularities of FIG. 9a in the form of a pitted pattern.

FIG. 9a shows the top view of a polycrystalline diamond body 900 having areas of enhanced surface irregularities 902, 903 and 904 which are positioned in a regular or repeatable pattern over at least a portion of at least one surface 901. The areas of enhanced surface irregularities are equal in size but of course may be different in size or shape. FIGS. 9b and 9c illustrate that each of the individual areas of enhanced surface irregularities can be in the form of either a regular or random pattern or a combination of some regular areas of enhanced surface irregularities and some random areas of enhanced surface irregularities.

FIG. 9b illustrates an area of enhanced surface irregularities 1118 in which the enhanced surface irregularities are positioned in a repeatable pattern and each individual area is in the form of gooves 1120. It should be understood that any of the regular forms of enhanced surface irregularities disclosed herein could be used in place of the grooves. FIG. 9c illustrates an area of enhanced surface irregularities 1122 in which the enhanced surface irregularities are positioned in a random pattern and each individual area is in the form of a pitted surface 1124.

In particular, in one embodiment all of the areas of enhanced surface irregularities 902 through 904 of the polycrystalline diamond body 900 of FIG. 9a are regular or repeatable as shown in FIG. 9b. In another embodiment all of the areas of enhanced surface irregularities 902 through 904 of the polycrystalline diamond body 900 of FIG. 9a are random as shown in FIG. 9c. In a third embodiment some of the areas of enhanced surface irregularities 902 through 904 of the polycrystalline diamond body 900 of FIG. 9a are regular as shown in FIG. 9b while other such areas are random as shown in FIG. 9c.

Figure 10A:
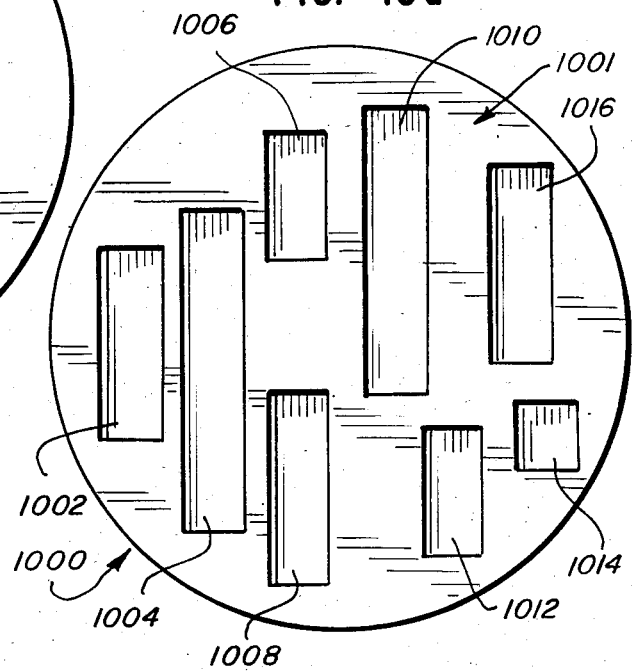
FIG. 10a is a top view of a disc shaped polycrystalline diamond body having areas of enhanced surface irregularities over at least one of its surfaces where the areas of enhanced irregularities are positioned in a random pattern.

FIG. 10a shows areas of enhanced surface irregularities 1002 through 1016 which are randomly positioned and varied in size over at least one surface 1001 of a polycrystalline diamond body 1000. Of course, the size of the randomly positioned areas of enhanced surface irregularities may be the same. It should be understood that the size of each area of enhanced surface irregularities is not necessarily to scale with respect to the surface of the polycrystalline diamond body.

Figure 10B:
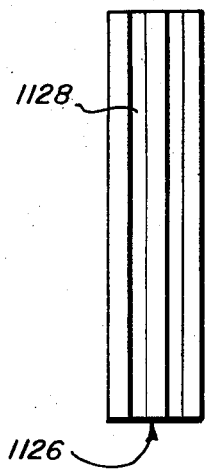
FIG. 10b is a top view of one area of enhanced surface irregularities of FIG. 10a in the form of a grooved pattern.
Figure 10C:
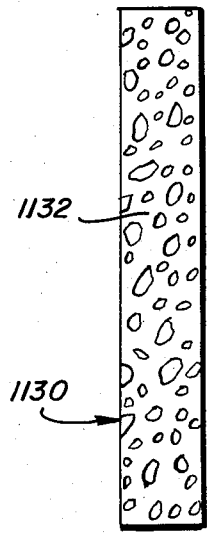
FIG. 10c is a top view of one area of enhanced surface irregularities of FIG. 10a in the form of a pitted pattern.

FIG. 10b illustrates an area of enhanced surface irregularities 1126 in which the enhanced surface irregularities are regular or repeatable and each individual area is in the form of grooves 1128. It should be understood that any of the regular forms of enhanced surface irregularities disclosed herein could be used in place of the grooves. FIG. 10c illustrates an area of enhanced surface irregularities 1130 in which the enhanced surface irregularities are random and each individual area is in the form of a pitted surface 1132.

In particular, in one embodiment all of the areas of enhanced surface irregularities 1002 through 1016 of the polycrystalline diamond body 1000 of FIG. 10a are regular as shown in FIG. 10b. In another embodiment, all of the areas of enhanced surface irregularities 1002 through 1016 of the polycrystalline diamond body 1000 of FIG. 10a are random as shown in FIG. 10c. In a third embodiment some of the areas of enhanced surface irregularities 1002 through 1016 of the polycrystalline diamond body 1000 of FIG. 10a are regular as shown in FIG. 10b while other such areas are random as shown in FIG. 10c.

Based upon the above description it is clear that each embodiment of this invention provides a polycrystalline diamond body with at least a portion of at least one of its surfaces having enhanced surface irregularities. The enhanced surface irregularities enable a polycrystalline diamond body of this invention to be attached to a holder or set into a metal matrix or other material without a carbide backing. The combination of the polycrystalline diamond body and holder or matrix results in a drilling, turning, cutting, or other similar tool wherein the unattached surface of the polycrystalline diamond body contacts a work piece and is subjected to operating forces. It is not necessary for all faces of the polycrystalline diamond body to have enhanced surface irregularities. Rather, only a portion of the face which is to be attached needs to have such irregularities. The total area of the attaching portion of the face with enhanced surface irregularities is greater than if the same portion of the polycrystalline diamond body were smooth. This total area is controlled in each embodiment by varying the density or size of the grooves, cross-hatches, holes, cavities, crevices or channels. As a result of the increased total attaching area, the attachment of the polycrystalline diamond body with the metal is made stronger.

In addition to the increased total attaching area, each of these embodiments with enhanced surface irregularities eliminates a surface for attachment which is entirely planar. When the attaching surface is smooth, there is a planar bond between the polycrystalline diamond body and the holder so that when a stress on the bond is introduced which is parallel to the plane of the bond, the entire stress is in the form of shear forces which will tend to break the bond and sever the polycrystalline diamond body from the substrate to which it is attached. By altering the geometry of the diamond-carbide interface with enhanced surface irregularities, vulnerablity to shear forces at the interface are reduced. The irregular surface strengthens the diamond-substrate attachment by eliminating the smooth planar interface where the diamond could separate. For separation to occur, shear forces must cut through portions of both the polycrystalline body and the attached substrate.

Figure 6:
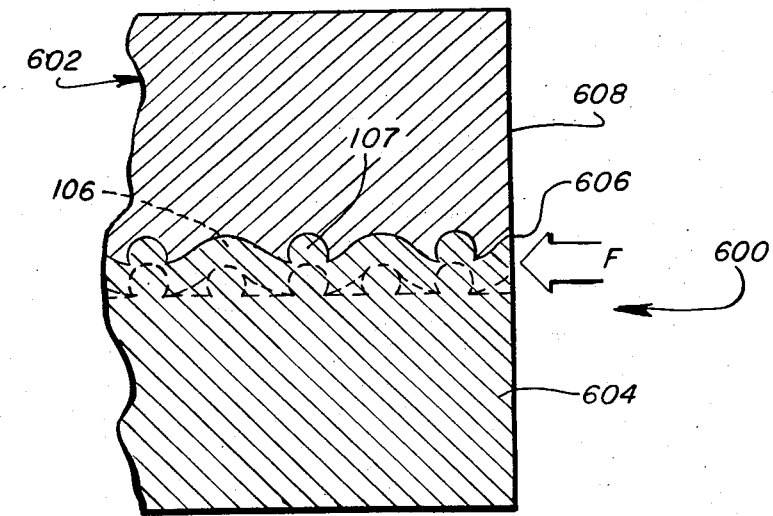
FIG. 6 shows a side view of the preferred embodiment of this invention with a textured surface over at least a portion of its surface which has been attached to a metal piece by conventional techniques.

FIG. 6 shows a tool 600 employing polycrystalline diamond bodies 602 in the preferred embodiment of this invention. At least a portion of a face of the polycrystalline diamond body 602 has been textured and attached to a holder 604 without the use of a carbide backing. A stress F is shown at the attachment interface 606 which is perpendicular to the side surface 608 of the polycrystalline diamond body. Phantom lines illustrate the textured diamond surface at the interface 606. In the case where the interface is smooth and planar, vulnerability to shear forces is in the plane of the weak diamond-substrate interface; however, where the geometry of the contacting face of the polycrystalline diamond body has been altered by enhanced surface irregularities in the form of a textured surface with channels 106 and holes 107, portions of the vulnerable planar interface are displaced so that in any given plane parallel to the diamond surface, all shear planes must intersect either the polycrystalline body, the attached substrate, or both. Consequently, the attachment interface 606 of the present invention is not as vulnerable to failure as a flat interface.

The mechanical interlock between the metal and the polycrystalline diamond body is also improved and strengthened by having the width of the channel 106 or the crevice 107 at the surface of the polycrystalline diamond body less than the width of the crevice or channel below the diamond surface through which a plane parallel to the diamond surface passes. This differential enables interlocking of the polycrystalline diamond body to an appropriate substrate such that portions of the diamond and substrate are plugged together. As a result of this stronger attachment, additional cutting surfaces, located at the sides 608 of the diamond are exposed for use rather than set into the metal matrix.

In the preferred embodiment, the enhanced surface irregularities of the polycrystalline diamond body are initiated during the press cycle when the polycrystalline diamond is being formed. In an alternative embodiment the enhanced surface irregularities of the polycrystalline diamond body are formed by a post press cycle technique.

Figure 1B:
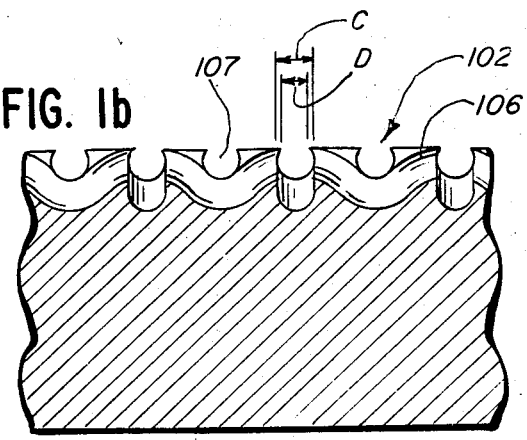
FIG. 1b is a section along line 1b—1b of FIG. 1a illustrating the crevices and channels at the surface of the polycrystalline diamond body.
Figure 7:
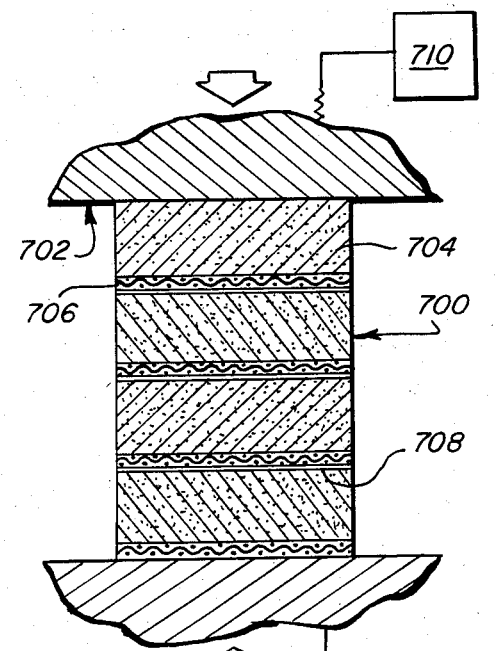
FIG. 7 is a side view of a container with a plurality of screens and diamond grains placed in a press before the polycrystalline diamond bodies are manufactured.

FIG. 7 illustrates a system used for making a plurality of polycrystalline diamond bodies with the textured surface 102 of FIGS. 1a and 1b in the container 700 of a press 702 under ultrahigh pressure and temperature conditions. Each textured polycrystalline diamond body is formed from powdered or granulated diamond 704. Either large or fine grain diamond may be used as starting material. However, the resulting polycrystalline diamond bodies of this invention are made porous when they are treated to remove the catalyst/binder from the diamond. Consequently, capillary type action can draw up metal from the attachment body when the porous polycrystalline diamond bodies are attached by brazing or matrix techniques, thereby furthering the interlocking between the diamond and attachment body. Fine grain diamond may be preferred for particular applications because when it is used, the capillary type action is increased so that interlocking caused by porosity is likewise increased.

The diamond 704 is placed on a screen 706 in the shape of the portion of the disc over which the textured surface is desired. A preferred mesh size for the screen is 25 U.S. mesh. Each diamond and screen combination is separated by a plate 708. The ultra high temperature and pressure of the press cycle is regulated by a controller 710. After the press cycle is completed, the polycrystalline diamond bodies formed with the screen 706 are removed from the container 700. Due to the high heat and pressure required to form the polycrystalline diamond, and because the polycrystalline diamond has formed surrounding the screen, the polycrystalline diamond body and screen are bonded together. The polycrystalline diamond body and screen combinations are placed in an appropriate acid bath 712 which dissolves the screen and results in a polycrystalline diamond body with enhanced surface irregularities in the form of a textured surface corresponding to the area vacated by the dissolved screen. Alternatively, other methods of removal such as electrolytic stripping or blasting techniques may be used. These methods are known and further description here is considered unnecessary. Because the screen 706 is woven, the textured surface of the polycrystalline diamond body has a plurality of resulting channels and crevices as illustrated in FIG. 1b.

The polycrystalline diamond body enhanced surface irregularities illustrated in FIGS. 2–5 can likewise be initiated during the press cycle. For the embodiments in FIGS. 2–4, disc shaped cemented carbide molds are used in place of the screen 706 of FIG. 7. Of course, other mold materials are also available including but not limited to graphite and zirconium. These molds make the enhanced surface irregularities of the polycrystalline diamond bodies of FIG. 2 with a grooved surface 202, the cross-hatched surface 302 of FIG. 3 or the waffled surface 404 of FIG. 4. The surface and shapes of these carbide molds and the extent that they form enhanced surface irregularities varies with the desired design of the particular embodiments.

Figure 8A:
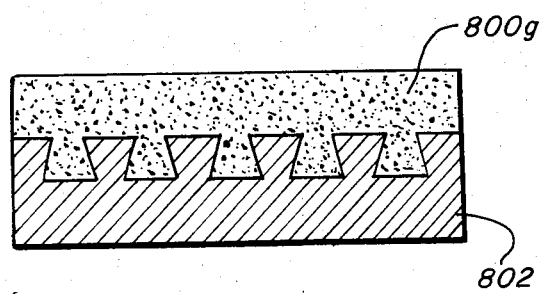
FIG. 8a is a side view of the diamond grains and a carbide mold before the press cycle.
Figure 8B:
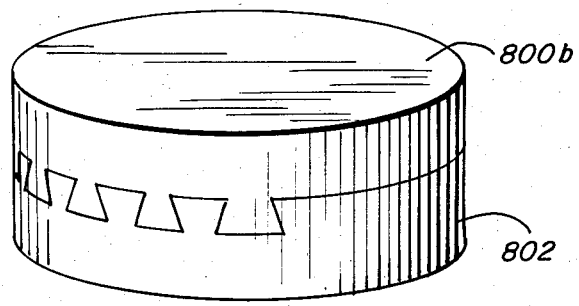
FIG. 8b illustrates a perspective view of the resulting polycrystalline diamond body formed with the mold in FIG. 8a after the press cycle.
Figure 8C:
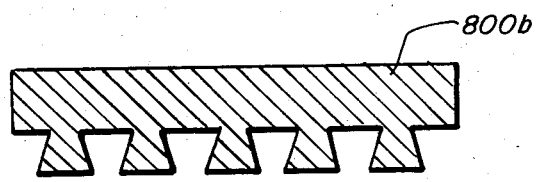
FIG. 8c shows a side sectional view of the polycrystalline diamond body with enhanced surface irregularities in the form of grooves with angled walls as in FIG. 2 after dissolving the mold in acid.

The method of using these molds is the same as with the screen 706 of FIG. 7. In particular, FIGS. 8a, 8b and 8c illustrate a method for making a polycrystalline diamond body with a grooved surface with angled walls as shown in FIG. 2. For each polycrystalline diamond body 800b a grooved mold 802 and diamond grains 800g are placed in the press container. A separator (not shown) is placed between each diamond/mold combination. Before being placed in the press, the container may be subjected to a settling process e.g., the container may be vibrated, to assure that diamond grains are in all portions of the mold. During the press cycle, the polycrystalline diamond body 800b formed from the grains 800g and mold 802 are sintered together as shown in FIG. 8b. After the press cycle it is necessary to place the polycrystalline diamond body/mold combination in an appropriate acid to dissolve or remove the mold 802. The resulting polycrystalline diamond body 800b is shown in FIG. 8c and has surface irregularities over the portion of its surface where the mold 802 was grooved. In this embodiment, the width X of the groove at its base is greater than the width at its top surface resulting in bars or elevations which are trapezoidal in cross section. These angled walls enable the diamond to be interlocked with an appropriate substrate such that the substrate is plugged with the polycrystalline diamond body at the interface and provides additional holding strength. In all embodiments, the form of enhanced surface irregularities are obverse to the design of the mold with which the polycrystalline grains were contacted and formed into a polycrystalline diamond body.

For the embodiment in FIG. 5, the square polycrystalline diamond body 500 with enhanced surface irregularities in the form of a pitted surface 502 can be formed during the press cycle with the use of free standing bodies such as carbide shavings or randomly sized carbide balls placed in a container which is also square. Alternatively, any desired shape may be obtained by machining the polycrystalline diamond body after the press cycle. These free standing bodies, replace the screen in FIG. 7 or the mold in FIG. 8. After the press cycle, the free standing bodies are enmeshed in the portion of the surface of the polycrystalline diamond body with which they were contacted during the press cycle. The free standing bodies are dissolved by placing the polycrystalline diamond body in an appropriate acid resulting in randomly positioned enhanced surface irregularities as in FIG. 5 where the pitted surface 502 has a plurality of irregularly shaped cavities 504.

The enhanced surface irregularities of the polycrystalline diamond bodies in FIGS. 2–4 also may be formed after the press cycle. With this post press cycle method, diamond grains are placed and separated into predeteermined units in a container 700 as in FIG. 7 (absent the screens 706). After the press cycle, the polycrystalline diamond bodies are removed and subjected to laser treatment or electric discharge machine (EDM) techniques resulting in enhanced surface irregularities formed over at least a portion of the polycrystalline diamond body. In particular, laser treatment can be used to make the grooves in FIG. 2, the cross-hatched design in FIG. 3 and the holes of FIG. 4 by varying the depth and width of the laser cutting capacity. EDM techniques such as wire or plunge cutting can be used to make the cross-hatched grooves of FIG. 3 or any other configuration of grooved surfaces.

The resulting polycrystalline diamond bodies with enhanced surface irregularities illustrated in FIGS. 1a–5 and manufactured from the above procedures satisfy the objectives of this invention and eliminate the problems associated with carbide backing. The form of enhanced surface irregularities can be varied and is not limited to the embodiments discussed herein. Likewise, the method of forming enhanced surface irregularities can be done during or after the press cycle and the techniques are variable. The essential thing is that enhanced surface irregularities are over at least a portion of a surface of a polycrystalline diamond body resulting in improved attachability of the polycrystalline diamond body and the elimination of the need for a carbide backing in surface mounting brazing applications. Also, the polycrystalline diamond bodies of the present invention can be set into a metal matrix without a substantial amount of the diamond body being buried in the metal matrix. The enhanced surface irregularities also provide improved attachment of the diamond set into a metal matrix. In addition, more cutting surfaces of the diamond are exposed for use.

This invention provides a polycrystalline diamond body which is attachable without a metal or cemented carbide backing so that it is not necessary to grow the polycrystalline diamond adjacent to a metal or cemented carbide substrate. This being the case, the problem associated with the migration of material from the substrate into the polycrystalline phase during the press cycle is eliminated. In particular, a silicon binder system can be used for polycrystalline formation with a non-contaminating mold, e.g., a graphite mold, which does not contaminate the polycrystalline phase.

Also, it is possible to leach the metal from the polycrystalline body of the present invention with acid since it is not necessary to preserve a metal or carbide backing. This leaching step is desirable because it can remove substantially all of the metal from the pores of the polycrystalline structure which otherwise would create both the problems of thermal instability and in some cases catalytic degradation.

The use of separators in the container as shown in FIG. 7 enables a plurality of polycrystalline diamond bodies to be formed for each press cycle. While the method whereby enhanced surface irregularities are formed during the press cycle in this invention requires some type of means for enhancing the surface, e.g., carbide, the amount of space required for the screen, mold or free standing bodies per polycrystalline diamond body is generally less than that required for the carbide backing in the composite compact. Therefore there is more space available for polycrystalline diamond formation and a plurality of polycrystalline diamond bodies may be formed during each press cycle. This ability to form a plurality of such bodies for each press cycle is efficient both in time and cost.

Thus a polycrystalline diamond body with enhanced surface irregularities and methods of manufacturing the same have been provided which meet the aforestated objects of this invention.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A polycrystalline diamond body having a preformed exposed attachment surface having attachment enhancing surface irregularities and adapted to be attached to holding means, said attachment surface irregularities being in the form of interwoven channels across said surface, said interwoven channels comprising a first plurality of undulating channels running in a first direction and a second plurality of undulating channels running in a second direction which is generally transverse to said first direction.

* * * * *